June 27, 1950 R. M. PAGE 2,512,673

RADIO PULSE DUPLEXING SYSTEM

Filed June 8, 1948

*INVENTOR.*
ROBERT M. PAGE

*BY* M. O. Hayes

ATTORNEY

Patented June 27, 1950 2,512,673

UNITED STATES PATENT OFFICE 2,512,673

RADIO PULSE DUPLEXING SYSTEM

Robert M. Page, Washington, D. C.

Application June 8, 1948, Serial No. 31,779

2 Claims. (Cl. 250—13)

Figure 1:
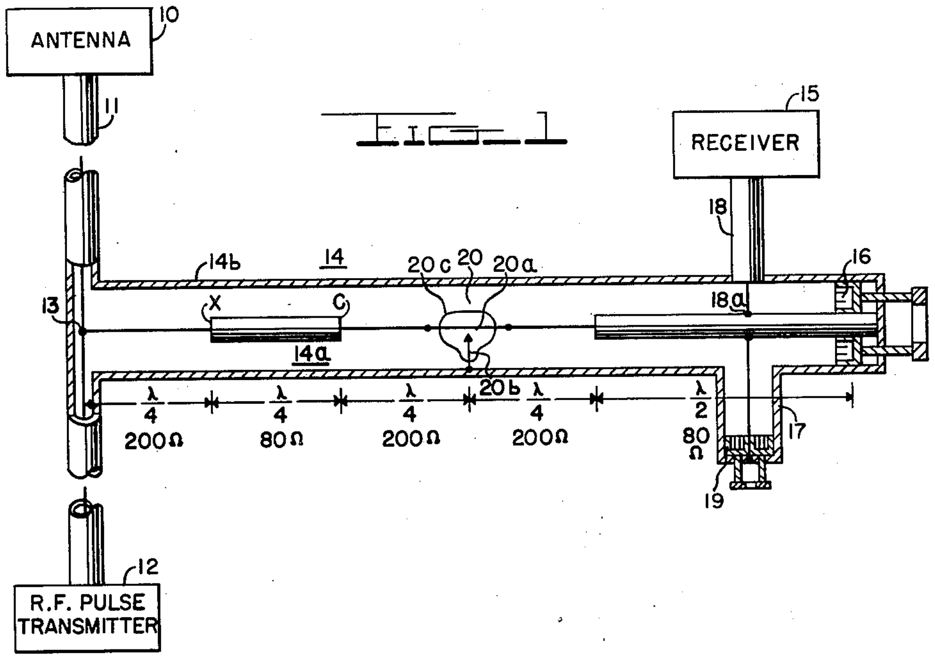

(Granted under the act of March 3, 1883, as amended April 30, 1928; 370 O. G. 757)

This invention relates to improvements in duplex transmission systems and particularly to high frequency radio systems utilizing a single transmission line for the transmission and reception of pulse signals.

The present invention is particularly concerned with radio pulse systems wherein a single transmission line is employed to transmit recurrent high powered pulses to a first load circuit and alternately recurring low powered pulses to a second load circuit which usually comprises delicate, sensitive, receiving equipment.

The practicability of such systems depends on the effectiveness of the apparatus used for decoupling the receiving equipment from the antenna during the high powered transmission intervals, namely, the completeness of receiver decoupling determines the amount of peak power which may be transmitted without damaging the receiver. Likewise, the effectiveness of the receiver decoupling apparatus in recoupling the receiver to the antenna during the intervals between high power pulses determines the sensitivity characteristics of the system. Specifically, the more effective the coupling between the receiver and the antenna during the intervals between transmitted pulses the greater the overall sensitivity of the receiving equipment.

It is accordingly an object of this invention to provide an improved and more effective receiver protective device for duplex radio pulse systems.

It is another object of this invention to provide an improved and more efficient receiver load protective device for duplex radio pulse systems offering greatly improved receiver protection characteristics.

It is still another object of this invention to provide an improved and more efficient receiver protective device for duplex radio pulse systems offering greatly improved energy transfer characteristics between the transmission circuit and the receiver load circuit during the period of transmitter inoperativeness.

In certain types of radio pulse systems the transmitting apparatus used therewith exhibits an impedance match to the output transmission line during periods of transmitter inoperativeness and an impedance mismatch during periods of transmitter inoperativeness. In such systems, a critical length of transmission line is used to couple the transmitter to the main line. This line section cooperates with the changing impedance characteristics of the transmitter to decouple the transmitter from the main transmission line during the period of inoperativeness. In other systems, however, the transmitter impedance does not change materially and some means for automatically decoupling the transmitter from the main line must be provided. It is accordingly another object of this invention to provide such a device.

It is another object of this invention to provide a transmitter decoupling device for duplex pulse radio systems offering greatly improved decoupling characteristics.

It is still another object of this invention to provide an improved and greatly more efficient transmit-receive switch for radio pulse duplex systems automatically operative during periods of high powdered transmission to decouple the receiver from the main line and further automatically operative during periods of reception to decouple the transmitter from the main line.

Figure 2:
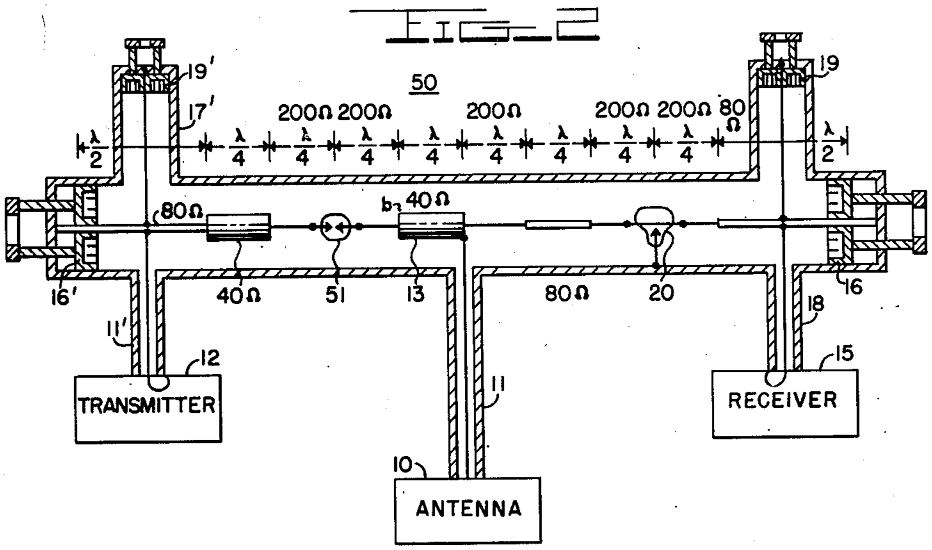

Other and more specific objects and attainments of the present invention will become apparent upon a careful consideration of the following detailed description when taken together with the accompanying drawings, in which:

Fig. 1 is a simplified cross sectional view of a receiver load protective device constructed in accordance with the teachings of the invention, and Fig. 2 is a simplified cross sectional view of a transmitter-receiver decoupling device also made in accordance with the teachings of the present invention.

In Fig. 1 to which reference is now had, there is disclosed my novel receiver protective device 14 as applied to a duplex radio pulse system. As indicated in the drawings, an antenna 10, or any other suitable load is connected through the main transmission line 11 to radio frequency pulse transmitter 12 and also through T-junction 13 and load decoupler 14 to receiver 15.

In this particular application, the radio frequency pulse transmitter 12 is preferably of the type which changes impedances between operation and quiescence. Accordingly, if transmitter 12 is of the type which exhibits a high impedance during periods of quiescence then the length of the transmission line 11 between the transmitter and the junction 13 should be made equal to an even number of quarter wave lengths to provide maximum decoupling of the transmitter. Conversely, if transmitter 12 is of the type which exhibits a low output impedance during periods of quiescence then the length of the line 11 between pulse transmitter 12 and junction 13 should equal an odd number of quarter wave lengths for optimum decoupling of the transmitter. In either event, the length of the transmission line 11 connecting junction point 13 and transmitter 12 is generally chosen so as to provide maximum decoupling of the transmitter from the antenna during the periods of transmitter quiescence.

Again as indicated in the drawing the receiver protective device 14 as herein illustrated comprises a concentric line which is equal to an odd number of ½ wave lengths long, which, in this particular illustration is chosen to be equal to three half wave lengths long. One end of the protective device is terminated in the main line 11 at junction 13 and the outer end is terminated in a short-circuiting tuning plunger 16. Plunger 16 is a generally annular cup shaped member of conventional design adapted to provide a movable short circuit between the inner and outer conductors 14A and 14B of device 14. To provide impedance matching at the output tap 18A, plunger 16 is made movable. Output line 18 is preferably a conventional coaxial conductor the inner and outer members of which are connected respectively to the inner and outer conductors of the device 14 at a point which suitably matches the input impedance to line 18. A stub line section 17 is connected to the device 14 preferably at the output tap 18A and is provided with a movable plunger 19 similar to plunger 16 operable to tune out the reactance of device 14 at the point of the output connection to line 18.

Inserted across the inner and outer conductors 14A and 14B of device 14, at a point an odd quarter wave length removed from junction 13 is a suitable non-linear impedance element 20 which in this instance is a spark gap enclosed within a glass envelope 20C. Impedance element 20 is provided with two electrodes 20A and 20B which connect respectively to the inner and outer conductors 14A and 14B of device 14.

The purpose of the non-linear impedance element is to provide an element in the circuit which exhibits a high impedance when subjected to low power impulses, such as echo signals, and to exhibit low impedance to high powered impulses such as those emitted directly from the transmitter 12.

More particularly, during periods of transmitter quiescence, the spark gap 20 is effectively deionized and appears as an open circuit across the inner and outer conductors 14A and 14B of device 14. In this condition the receiver 15 is matched to the line 11 and also to the antenna 10. During periods of transmitter operation however, gap 20 becomes ionized by the transmitted power and thus becomes a low impedance across the decoupler line 14. Now then, since gap 20 is disposed across the decoupler line section 14 at a point which is an odd number of quarter wave lengths removed from the junction 13 the impedance of device 20 will consequently be inverted at the junction 13. Accordingly, the low impedance of gap 20 during its ionized condition will be reflected as a high impedance at junction 13. Thus the impedance looking into the decoupler line section 14 at junction 13 will be greatly mismatched from the line impedance of the main line 11, and the receiver therefore will be effectively decoupled from the antenna during the transmitting intervals.

Systems operating in the above described manner and having the same general characteristics are now well known in the art and it can be generally said that they offer adequate protection to the receiver under low and medium low transmitted power conditions. The amount of receiver protection of course depends upon the mismatch in impedances which can be obtained at the junction 13 and this in turn is directly proportional to the square of the characteristic impedance of the line section 14 and inversely proportional to the impedance of the gap in an ionized condition. Accordingly, the impedance of the gap and the characteristic impedance of the line section 14 jointly operate to limit the amount of protection which can be provided for the receiver.

If the ionized impedance of the gap 20 could be reduced to zero then complete protection of the receiver would result with the above operation. Such is not the case, however, since under the most favorable conditions the ionized impedance of the gap 20 is often as large as 40 ohms. A gap displaying a minimum impedance of this magnitude will not afford complete receiver protection when installed in the 80 and 200 ohm lines that are now in present day use. For example, a gap displaying this magnitude of impedance when installed in an 80 ohm line would produce a surge impedance at junction 13 of only 160 ohms and when installed in a 200 ohm line would produce a surge impedance of only 1000 ohms.

With the present invention, however, a gap having an ionized impedance similar to that described above can be employed to provide almost complete receiver protection. Specifically, in the preferred embodiment herein shown, which it must be understood is only exemplary, I can obtain a surge impedance at junction 13 which exceeds 6000 ohms.

Briefly and in accordance with the fundamental concepts of the invention, the protective line section 14 is constructed to provide a transmission path offering alterant high and low impedance points therein. The gap 20 is then disposed at a high impedance point while the receiver or load output tap is taken at an impedance matching point. In this manner the relatively low ionized impedance of the gap is transformed into an extra high impedance at the junction 13.

In particular I accomplished the foregoing objective by employing a series of impedance transformer sections, or odd quarter wave length line sections of alternately high and low characteristic impedance. As shown in the drawings these line sections are formed by using a common and continuous outer conductor 14B of a fixed diameter and an inner conductor having alternately constricted and enlarged diametrical dimensions. As further indicated in the drawings, which is taken to illustrate a typical condition where the main transmission line 11 and the receiver transmission line 18 are both of the 80 ohms, the inner conductor of the receiver protection line 14 adjacent junction 13 is constricted in diameter to provide a 200 ohm line section of one quarter wave length. Immediately following this line section is an enlarged inner conductor section forming an 80 ohm line section also of a quarter wave length long. This last section is then followed by another constricted inner conductor section forming another 200 ohm line section. The gap 20 is located at the end of this last section. Then from the gap 20 proceeding to the receiver connection 18*a*, a 200 ohm line section and an 80 ohm line section follow.

These line sections are so organized that the receiver 15 is matched to the main line 11 during the intervals that gap 20 is deionized. When gap 20 becomes ionized however, its impedance lowers to approximately 40 ohms as above mentioned, In this condition the surge impedance at point C looking toward the gap becomes 1000 ohms. The surge impedance again looking toward the gap at point X is 6.4 ohms and finally the surge impedance looking into the line section 14 at junction 13 is 6250 ohms. Thus it becomes evident that with a given gap impedance the mismatch looking into the protective device at 13 can be raised by a factor of 6¼ times over that obtainable by the use of a straight 200 line section connecting the gap to the main line 11. This arrangement affords almost complete receiver protection and can be obtained by using standard components.

Again, it is here to be expressly understood that the embodiment illustrated in Fig. 1 is only exemplary and that in actual practice the line section 14 may take other forms such as an ordinary parallel wire line. Likewise the characteristic impedance of the successive quarter wave length line section may assume values distinct to that shown in the drawings.

Apparatus, which is exemplary of the present invention and which is adapted to perform the composite function of transmitter and receiver decoupling is illustrated in Fig. 2, to which reference is now had. In this embodiment the transmitter 12 and receiver 15 are each coupled to the antenna 10 through separate sections of the transmit-receive device 50.

In general device 50 utilizes the same principles of operation and construction as employed in the receiver protective device 14 of Fig. 1. In particular, that portion of device 50 coupling the receiver 15 to the antenna 10 is identical to that illustrated in Fig. 1. For instance, the same arrangement of impedance transformation means are used to build the surge impendance up to a suitable level for installation of the gap 20. The latter element is again disposed in the transmission path at a point three quarter wave lengths removed from the antenna junction point 13.

Accordingly, since the receiver decoupler portion of device 50 is structurally and functionally identical with the corresponding element 14 shown in Fig. 1 no further explanation thereof is deemed necessary.

Referring now to the transmitter decoupling portion of device 50 it will be seen that this element is somewhat similar to the receiver decoupler. In particular, the transmitter decoupler comprises a series of tandemly connected impedance transformer sections arranged to provide alterant high and low surge impedance points along the line. A second non-linear element indicated at 51 is inserted in series with the inner conductor of the line section at a point of high impedance.

In the embodiment herein exemplified the transmitter decoupler comprises in particular, a forty ohm quarter wave section at junction 13 followed by a 200 ohm quarter wave section, which is terminated in the series spark gap 51. Following the gap 51 is another 200 ohm quarter wave section and then another 40 ohm quarter wave section, and finally an 80 ohm one half wave section terminating in the shorting circuiting plunger 16′ added for the same purpose as plunger 16. A second stub line 17′ and associated tuning plunger 19′ are added for the same purpose as their counterparts 17 and 19.

The transmitter 12 is tapped in to device 50 by line 11′ at a point providing impedance matching.

Gap 51 like gap 20 is located at a high impedance point in the transmission path. The purpose of so locating gap 51 is to minimize its consumption of transmitted energy thereby affording better coupling efficiency between the transmitter and the antenna during periods of transmission.

In operation, emission of a pulse from transmitter 12 ionizes the both gaps 51 and 20. Ionization of gap 20 operates to insert a low impedance across device 50 at a point three quarters of a wave length removed from the junction 13. This low impedance, as hereinabove described is transformed into a high impedance at junction 13 and thus operates to decouple the receiver from the transmitter.

Ionization of gap 51 simply completes the circuit enabling energy to be propagated from the transmitter 12 to the antenna 10. It will be noted that in the ionized condition of the gaps 51 and 20 junction 13 is terminated in the impedance of line 11 since gap 20 reflects an effective open circuit at junction 13 at this instant. In this condition assuming line 11 to be 80 ohms for example and the impedance of antenna 10 is matched to line 11, then the surge impedance appearing at point b looking toward junction 13 becomes 20 ohms. The surge impedance at gap 51 in this condition is 200 ohms. Hence gap 51 is at a high impedance point (low current) in the line and the low ionized impedance, 40 ohms, of gap 51 is negligible by comparison. Thus the power loss in gap 51 is also negligible and a very efficient coupling between the transmitter and the antenna results. The 200, 40 and 80 ohm sections interposed between the gap 51 and the end of the line act to lower the high surge impedance appearing at the gap to a level suitable to match the output impedance of the transmitter.

In operation, during reception both gaps 20 and 51 are deionized with the result that the antenna is coupled to the receiver 15 in the manner previously described. Gap 51 in this condition appears as an open circuit and since it is one half wave length removed from junction 13 the same will reflect an open circuit at this joint.

It will be apparent from the foregoing that the present invention provides a greatly improved and more efficient transmitter receiver decoupler than provided by the prior art. It will also be recognized that by the use of impedance transformation sections to build up the impedance to a high level for insertion of the spark gaps, or other non-linear elements, it is possible to minimize the power loss in these elements thereby increasing not only the operating efficiency of the apparatus but also increasing the life of the gaps themselves.

Accordingly, although I have shown only one specialized embodiment of the present invention it is to be expressly understood that I am fully aware of the many modifications possible thereof. For example, the non-linear elements 20 and 51 need not be of the spark-gap type since ordinary thermionic diodes also may be used.

Likewise, it is also within the spirit of this invention to construct the devices 14 and 50 from a line section having a uniform inner diameter and alternately enlarged and constricted outer diameters. Similarly, alternate types of transmission line sections may be utilized. For example, the invention may readily be applied to a parallel line if desired. Accordingly, the scope of this invention is not to be limited except insofar as is defined in the appended claims.

The invention described herein may be manufactured and used by or for the Government of the United States of America for governmental purposes without the payment of any royalties thereon or therefor.

What is claimed is:

1. In combination, a source of intermittent radio frequency power, first and second load circuits, a transmission circuit connecting said source of power to the first load circuit comprising, a series of impedance transformation means tandemly connected to provide a transmission path having alternate high and low impedance points therein, a non-linear impedance element incorporated in said transmission path at a high impedance point, a similar transmission path connecting the source of power to the second load, and a second non-linear element incorporated in the last named transmission path at a high impedance point therein.

2. In combination, a source of intermittent radio frequency power, first and second load circuits, a transmission circuit connecting said source of power to the first load circuit comprising, a series of impedance transformation means tandemly connected to provide a transmission path having alternate high and low impedance points therein, a non-linear impedance element incorporated in series relationship with said transmission path at a high impedance point, a similar transmission path connecting the source of power to the second load, and a second non-linear element incorporated in shunt relationship with the last named transmission path at a high impedance point therein.

ROBERT M. PAGE.

REFERENCES CITED

The following references are of record in the file of this patent:

UNITED STATES PATENTS

| Number | Name | Date |
|---|---|---|
| 1,035,958 | Girardeau | Aug. 20, 1912 |
| 2,438,367 | Keister | Mar. 23, 1948 |

OTHER REFERENCES

Principles of Radar, MIT Radar School Staff, second edition, published 1946 by McGraw-Hill Co.